United States Patent [19]

Wollaber et al.

[11] Patent Number: 5,060,720
[45] Date of Patent: Oct. 29, 1991

[54] METHOD AND APPARATUS FOR COOLING MOTORS OF CROSS FLOW BLOWERS

[75] Inventors: Bruce A. Wollaber, Nolensville; Robert G. Stanford, Murfreesboro, both of Tenn.

[73] Assignee: Inter-City Products Corporation (USA), LaVergne, Tenn.

[21] Appl. No.: 561,890

[22] Filed: Aug. 2, 1990

[51] Int. Cl.$^5$ .................... H02K 9/00; F04B 172/00
[52] U.S. Cl. ............................ 165/122; 62/262; 417/371; 310/58
[58] Field of Search ............... 417/371, 423.8; 165/122; 62/262; 310/58

[56] References Cited

U.S. PATENT DOCUMENTS

| 1,260,282 | 3/1918 | Harrold | 417/371 X |
| 3,200,609 | 8/1965 | Laing | 62/280 |
| 4,111,000 | 9/1978 | Sakazume et al. | 62/262 |
| 4,236,443 | 12/1980 | Schossow | 417/371 X |

FOREIGN PATENT DOCUMENTS 992399  5/1965  United Kingdom ............. 165/122

OTHER PUBLICATIONS

Bulletin of the JSME, vol. 19, No. 129, Mar. 1976, pp. 314–321.
International Conference on Fan Design & Applications, Paper J1, "The Effect of Rotor and Casing Design on Cross-Flow Fan Performance", D. J. Allen, Sep. 1982.
"Investigation of the Flow Characteristics in the Impeller of the Tangential Fan", T. Lajos, Jun. 1982.

Primary Examiner—William E. Wayner
Attorney, Agent, or Firm—Jeffers, Hoffman & Niewyk

[57] ABSTRACT

The present invention is an air conditioner with tangential blowers having an arrangement for cooling the blower's driving motor. The motor is attached exteriorly from the air moving chamber and the sidewall through which the motor is attached to the blower includes an axially located aperture. Blade extensions of the blower near the aperture induce an air flow through the aperture, and the induced air flow passes through the motor to carry away undesired heat. A seal can be formed between the motor and sidewall so that the induced air flow must pass through the motor.

22 Claims, 3 Drawing Sheets

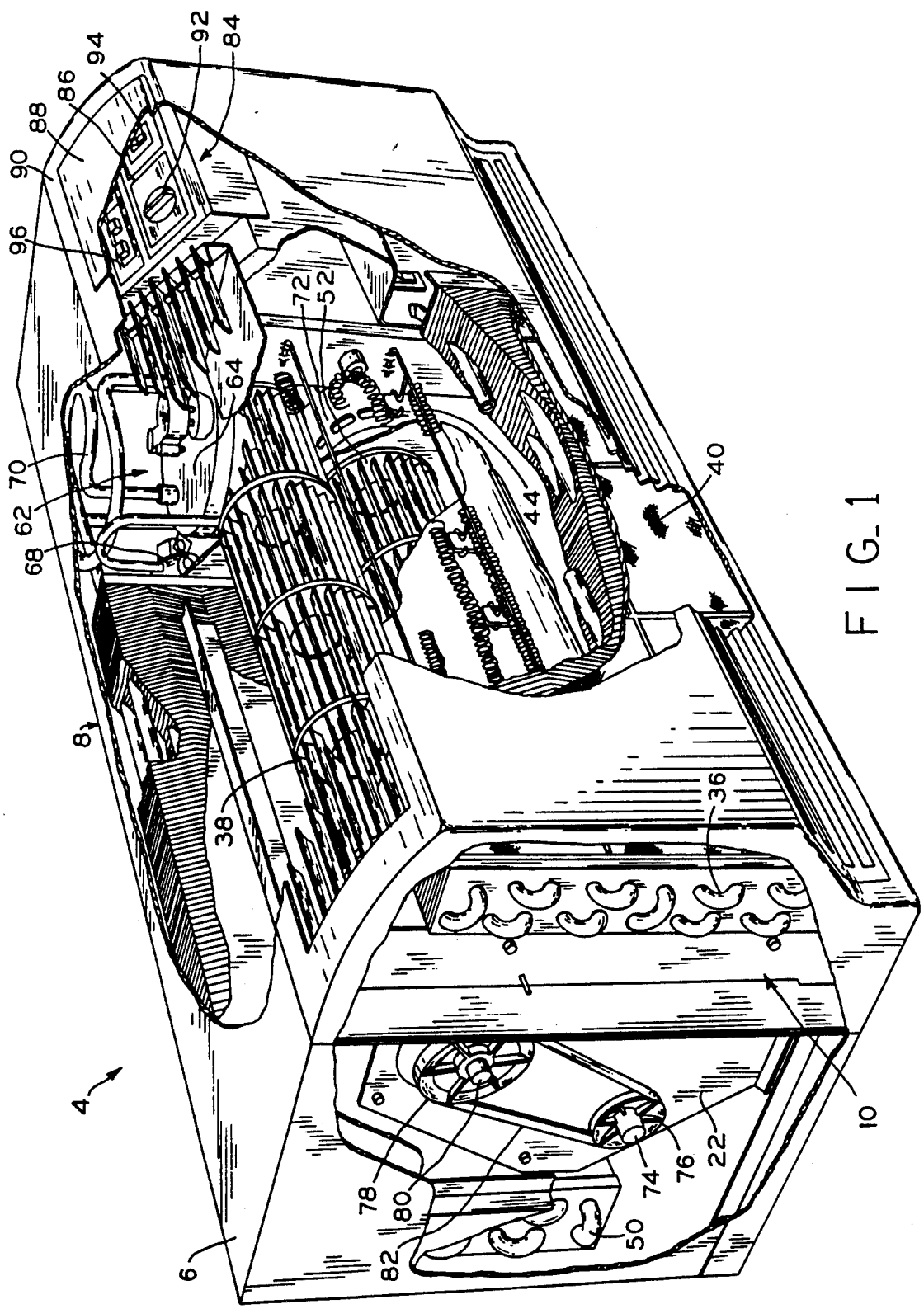
FIG_1

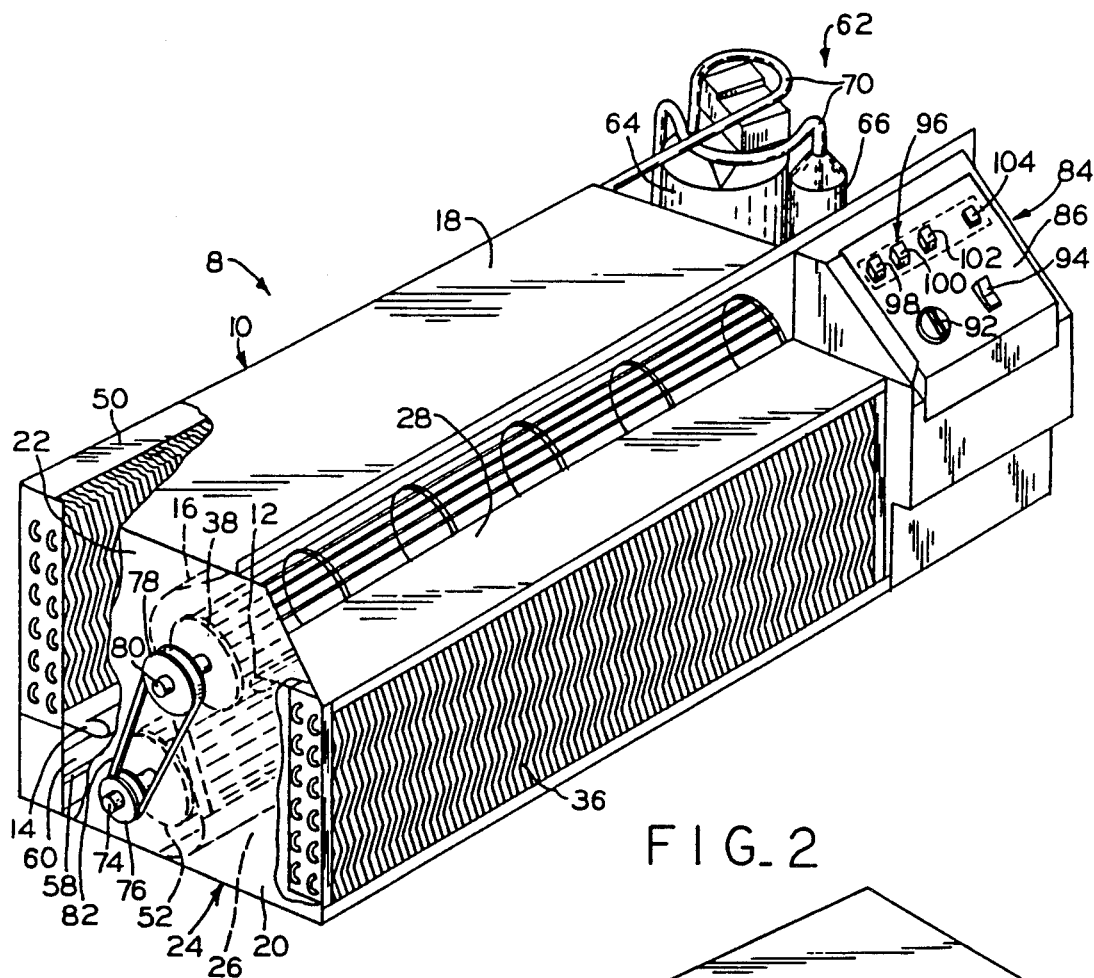
FIG_2
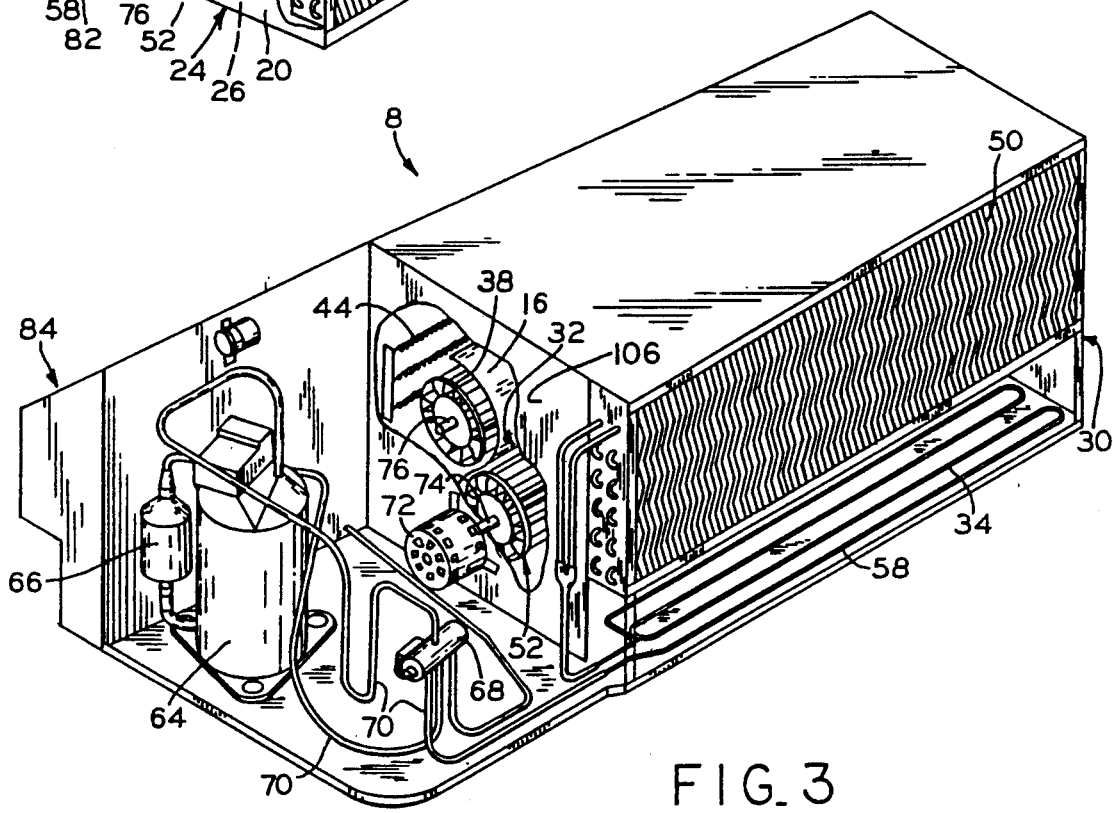
FIG_3

METHOD AND APPARATUS FOR COOLING MOTORS OF CROSS FLOW BLOWERS

BACKGROUND OF THE INVENTION

The present invention relates to cross flow blowers. More specifically, the field of the invention is that of apparatus and methods for cooling motors which drive tangential blowers in air conditioners.

Conventional packaged air conditioners and heat pumps generally include both a conventional centrifugal blower for the indoor heat exchanger and an axial blower for the outdoor heat exchanger. All conventional packaged terminal air conditioners also include some type of dividing wall which divides the indoor portion of the unit from the outdoor portion of the unit. Air is conventionally drawn into the unit through the sides, the rear, the outside, or the bottom of the unit and is blown out of the unit after passing over the heat exchangers.

Air conditioners which have tangential fans for moving air are much more quiet than conventional units because of the lower air velocity through the blowers and optimum spacing between the blower and the cut-off of the air conditioner. Furthermore, the induced air flow through the heat exchanger coils is much more uniform than in conventional units thereby causing substantially full utilization of the indoor and outdoor heat exchanger coils and providing greater efficiency of the appliance.

Further details of a packaged terminal air conditioner are disclosed in copending U.S. patent applications entitled AIR CONDITIONER WITH DUAL CROSS FLOW BLOWERS, Ser. No. 478,342, AIR INTAKE ARRANGEMENT FOR AIR CONDITIONER WITH DUAL CROSS FLOW BLOWERS, Ser. No. 478,416, and DRIVING SYSTEM FOR DUAL TANGENTIAL BLOWERS IN AN AIR CONDITIONER, Ser. No. 478,410, filed on Feb. 12, 1990, and assigned to the assignee of the present invention, which disclosures are incorporated herein by reference.

However, one problem with using tangential cross flow blowers is keeping the motor windings and bearings cool, especially in larger capacity units. The conventional design of a packaged terminal air conditioner having a tangential blower does not provide for ventilation of the motor other than the conventional cooling vents located in the motor housing. High temperatures occurring during operation of the motor can cause motor failure. For centrifugal and propeller type fans, the motor is often placed in the airstream generated by the fan. With tangential blowers, the air flow is perpendicular to the blower's axis of rotation. Some tangential fans have their motor located within the conditioned space behind the air conditioner coil, but this requires additional parts for mounting the motor.

What is needed is an air conditioner which cools the driving motor without sacrificing efficiency and airflow over the heat exchangers.

Also needed is an air conditioner which simplifies the air conditioner design while cooling the driving motor.

Further needed is a method for minimizing the cost and complexity of cooling the driving motor.

SUMMARY OF THE INVENTION

The present invention is an air conditioner with tangential blowers having an arrangement for cooling the blower's driving motor. The cooling arrangement is located in a sidewall of the housing, which provides a low cost solution to the problem of motor overheating.

In the bulkhead of a compartment of the housing, an aperture is located which allows air to be induced through the motor and into the axial center of the tangential blower. The end of the tangential blower includes extending blades which, when rotated, generate a negative pressure within the blower. The blade extensions have the effect of a centrifugal blower by generating an axial flow through the aperture, with the axial flow carrying off undesired heat from the motor.

The present invention, in one form, is an air conditioner comprising a housing, a heat exchanger, a tangential blower, and a motor. The housing includes a compartment for conditioning air which is defined on one side by a sidewall. The heat exchanger is disposed within the air conditioning compartment. The tangential blower is disposed in the air conditioning compartment and is adapted to circulate air around the heat exchanger. The motor is drivingly connected to the tangential blower, and is located on the exterior of the air conditioning compartment. The sidewall is arranged so that the tangential blower is cooled by drawing air through the motor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of the air conditioner of the present invention.

FIG. 2 is a perspective front view of the air conditioner of FIG. 1 without the cabinet.

FIG. 3 is a perspective rear view of the air conditioner of FIG. 1 without the cabinet.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 4:
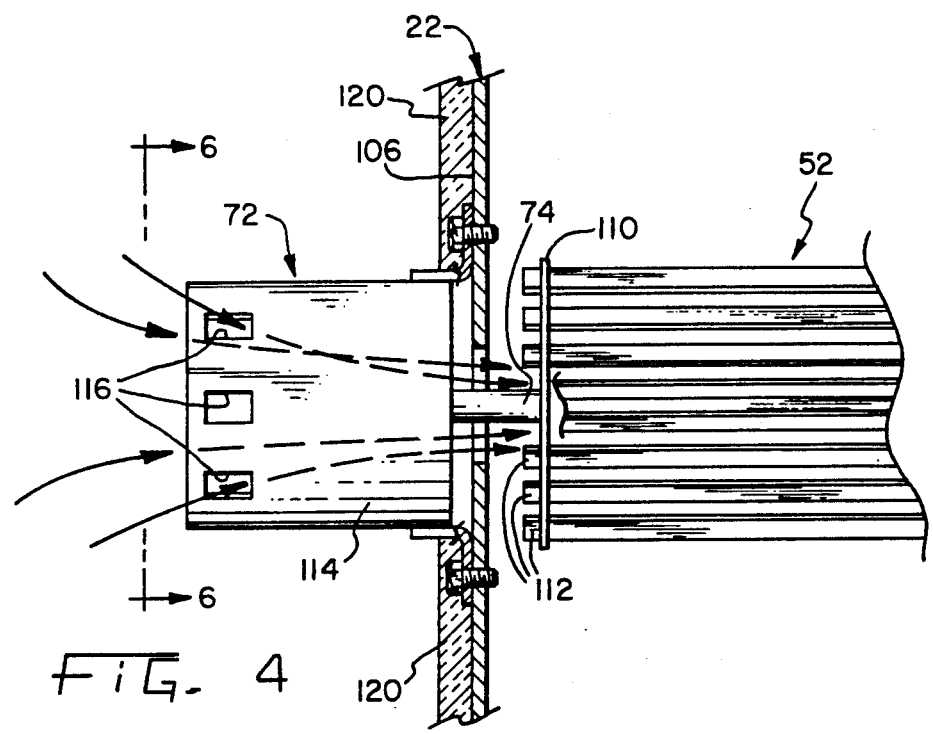
FIG. 4 is a front view isolating the motor and tangential blower.

The present invention is a packaged terminal air conditioner 4 shown in FIGS. 1-3. Within cabinet 6, the air conditioner unit 8 has four basic elements: housing 10, indoor cut-off 12, outdoor cut-off 14, and divider wall 16. Housing 10 has a top wall 18, a basepan 20, and side walls 22. Indoor cut-off 12 partitions the front or indoor compartment 24 into an indoor inlet section 26 and an indoor outlet section 28. Outdoor cut-off 14 partitions the rear or outdoor compartment 30 into an outdoor inlet section 32 and an outdoor outlet section 34. Divider wall 16 separates indoor compartment 24 and outdoor compartment 30.

Indoor compartment 24 has a heat exchange coil 36 located within inlet 26, and has a tangential or cross flow blower 38 located upwardly therefrom between indoor cut-off 12 and divider wall 16 near outlet 28. Filter 40 is placed in front of indoor heat exchanger 36 for filtering the recirculated air. Electric heating wires 44 extend within indoor compartment 24 between side walls 22 intermediate indoor heat exchanger 36 and blower 38; heating wires 44 provide additional heat when the heat pump alone cannot provide enough heat. Blower 38 induces a lower air flow which passes over heat exchanger 36, heating wires 44, and is then exhausted upwardly through outlet 28.

Outdoor compartment 30 also has a heat exchange coil 50 located within inlet 32, and has tangential or cross flow blower 52 located downwardly between outdoor cut-off 14 and divider wall 16 near outlet 34. Blower 52 induces an upper air flow which passes over heat exchanger 50 and is then downwardly exhausted through outlet 34. Desuperheater coil 58 is located at the bottom 60 of outdoor compartment 30 and is used to evaporate condensate from indoor heat exchanger coil 36. Alternately, outdoor cut-off 14 can be positioned to capture condensate and route the condensate to a pump, draining valve, or other means of condensate disposal.

The refrigeration components 62 are positioned within cabinet 6 on one side of air conditioning housing 10. Compressor 64, accumulator 66, valve 68, and refrigerant lines 70 of components 62 operate in a known manner to appropriately heat or cool heat exchanger 36 for conditioning indoor air 42. Electric motor 72 is also located in the same general area of components 62, and drives both indoor blower 38 and outdoor blower 52.

Motor 72 is connected to axis or shaft 74 of driving blower 52, preferably by a resilient hub (not shown). On the opposite side, pulleys 76 and 78 are connected to axes 74 and 80 of driving and driven blowers 52 and 38, respectively. Belt 82 couples pulleys 76 and 78 so that the rotational movement imparted to driving blower 52 is transmitted to driven blower 38. Preferably, driving pulley 76 has a smaller circumference than driven pulley 78 to provide a slower and more comfortable exhaust air flow for the indoor occupants.

Components 62 and motor 72 are electrically coupled to control unit 84. Control unit 84 is located on the same side of air conditioning housing 10 as components 62 and has a control panel 86 facing upwardly under control cover 88 of cabinet 6. Control cover 88, as well as the other parts of the top surface of indoor panel 90, has a sloping, curved upper surface which helps to prevent damage from the occupants placing heavy objects upon it. In one embodiment, control panel 86 has a rotary switch 92 for variably selecting the temperature intensity, a fan speed switch 94 for selecting between two different fan speeds, and four mutually exclusive mode setting switches 96: cooling mode 98, heating mode 100, fan only mode 102 and off 104. Also included within unit 84, although not shown, is a temperature limiting device which can be set by the owner to prevent the air conditioner from operating outside a predetermined range of temperature settings.

Figure 5:
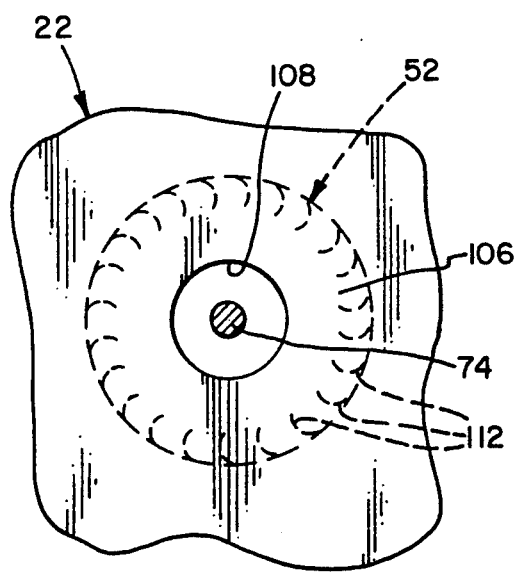
FIG. 5 is side view isolating the sidewall and tangential blower.

In accordance with the present invention as depicted in FIGS. 4-5, the sidewall 22 which is adjacent to motor 72 includes bulkhead 106 for mounting motor 72. Also, bulkhead 106 includes aperture 108 which is axially located relative to motor 72. Air can pass through motor 72 and aperture 108 to cool motor 72. Blade extensions 112 protrude towards aperture 108 from end disk 110 of tangential blower 52 and when rotated create an negative pressure in the axial space within tangential blower 52 to thereby induce air flow through aperture 108.

Figure 6:
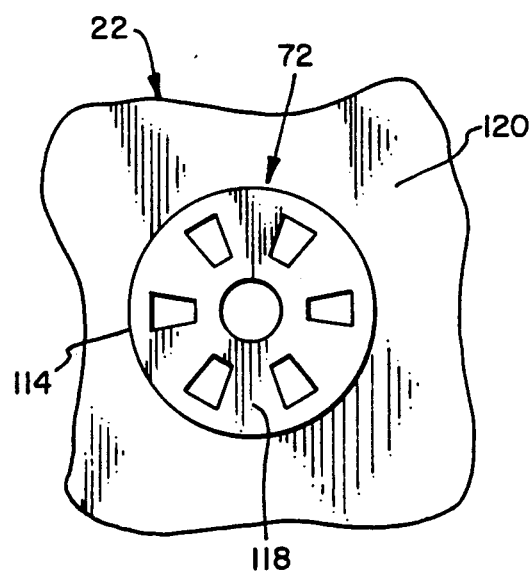
FIG. 6 is a plan view taken along view lines 6—6 of FIG. 4.

Motor 72 has outer shell 114 which includes vent holes 116 and an apertured end bell 118 (See FIG. 6) for allowing air to pass through the interior of motor 72. To facilitate an induced air flow through motor 72, vent holes 116 may be removed from the motor shell so that apertured end bell 118 provides the only openings to the interior of motor 72 which allows air to pass through aperture 108.

In operation, air conditioning unit 8 is activated by mode switches 96. If fan only switch 102 is switched on, then only motor 72 is activated to rotate blower 52 according to a speed determined by fan speed switch 94. If cooling mode switch 98 is switched on, the compressor 64 begins to operate and valve 68 is positioned to cool indoor heat exchange 36, and motor 72 is activated to rotate blower 52 according to a speed determined by fan speed switch 94. If the heating mode switch 100 is on, then compressor 64 begins to operate and valve 68 is positioned to heat indoor heat exchanger 36 and motor 72 is activated to rotate blower 52 according to a speed determined by fan speed switch 94. Also in the heating mode, heating wires 44 may be actuated to produce additional heat and warm indoor air 42. In all of the modes except off 104, blowers 38 and 52 operate to move air and induce flow through inlets 26 and 32, then exhaust air through outlets 28 and 34.

During operation of blowers 38 and 52, blade extensions 112 rotate and radially expel air, which creates a negative pressure within blower 52. Air is induced to flow through aperture 108, and that air flow carries off undesired heat from motor 72. The motor cooling air is radially expelled by blower 52, and enters the upper air flow in outdoor compartment 30. Blade extensions 112 act like a centrifugal blower because they create an axial flow through aperture 108. By cooling motor 72 during its operation, the reliability of the motor is increased and the chance of motor failure is decreased, especially in high capacity air conditioners operating at low speeds.

The manufacture of packaged terminal air conditioner 4 is efficiently accomplished because of the bifurcated design. The air circulating portion is contained within housing 10, which can be assembled separately. Refrigeration components 62, associated motor 72, and control unit 84 can also be separately assembled on a frame (not shown). To complete an individual unit, housing 10 is attached to the frame, motor 72 is connected to axis 74, and refrigerant lines 70 are coupled to indoor heat exchanger 36, outdoor heat exchanger 50, and desuperheater coil 58. Motor 72 is attached to bulkhead 106 by screws or other suitable means. Additionally, fiberglass insulation 120 or other material may be placed around motor 72 which generally inhibits air flow between shell 114 and bulkhead 106 to force air flow through motor 72 (See arrows in FIG. 4).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus comprising:
   a housing including a compartment for moving air, said compartment defined on one side by a sidewall;
   a tangential blower disposed in said air moving compartment and adapted to circulate air;
   a motor drivingly connected to said tangential blower, said motor located exteriorly of said air moving compartment; and
   means for cooling said motor by drawing air through said motor, said cooling means including an axially located aperture in said sidewall whereby said tangential blower induces an axial air flow through said motor and through said aperture.

2. The apparatus of claim 1 wherein said cooling means includes an axially located aperture in said sidewall for allowing fluid communication between said tangential blower and said motor, said tangential blower further including blade extensions located adjacent said aperture whereby air is drawn through said motor and through said aperture.

3. The apparatus of claim 2 wherein said motor is sealingly connected to said aperture whereby air drawn through said aperture must pass through said motor.

4. The apparatus of claim 2 wherein said motor includes an axially located shaft connected to said tangential blower through said aperture.

5. The apparatus of claim 2 wherein said tangential blower includes an end disk adjacent to said aperture, and said blade extensions protrude beyond said end disk towards said aperture.

6. The apparatus of claim 2 wherein said motor includes an outer shell which includes an apertured end bell, and said motor is sealingly connected to said sidewall around said aperture whereby air drawn through said aperture must pass through said end bell.

7. The apparatus of claim 1 wherein said motor is mounted on the exterior surface of said sidewall.

8. The apparatus of claim 1 wherein said motor includes an outer shell, and said outer shell includes an end bell having at least one air vent therein for allowing air to pass into and through said motor shell.

9. An air conditioner comprising:
   a housing including a plurality of sidewalls which define a first compartment and a second compartment;
   a first heat exchanger coil mounted in said first compartment of said housing;
   a second heat exchanger coil mounted in said second compartment of said housing;
   a first tangential blower mounted in said first compartment for circulating air through said first heat exchanger;
   a second tangential blower mounted in said second compartment for circulating air through said heat exchanger;
   a motor for driving at least one of said first and second tangential blowers, said motor exteriorly located in relation to said housing, and
   means for cooling said motor by drawing air through said motor, said cooling means located in said sidewall;
   said cooling means including an axially located aperture in one of said sidewalls for allowing fluid communication between one of said first and second tangential blowers and said motor, and said one tangential blower further including blade extensions located adjacent to said aperture whereby air flow is induced through said motor and then through said aperture.

10. The air conditioner of claim 9 wherein said motor is sealingly connected to said aperture whereby any air drawn through said aperture must pass through said motor.

11. The air conditioner of claim 9 wherein said motor includes an axially located shaft connected to said one tangential blower through said aperture.

12. The air conditioner of claim 9 wherein said one tangential blower includes an end disk adjacent to said aperture, and said blade extensions protrude beyond said end disk towards said aperture.

13. The air conditioner of claim 9 wherein said motor includes an outer shell which includes an apertured end bell, and said motor is sealingly connected to said one sidewall around said aperture whereby an air drawn through said aperture passes through said end bell.

14. The air conditioner of claim 9 wherein said motor is mounted on the exterior surface of said housing.

15. The air conditioner of claim 9 wherein said motor includes an outer shell, and said outer shell includes an end bell having a plurality of air vents therein for allowing air to pass into and through said motor shell.

16. An air conditioner comprising:
   a housing including a sidewall;
   a tangential blower disposed in said housing;
   a motor drivingly connected to said tangential blower, said motor located exteriorly of said housing; and
   means for cooling said tangential blower by drawing air through said motor, said cooling means including an axially located aperture in said sidewall for allowing fluid communication between said tangential blower and said motor, said tangential blower further including blade extensions located adjacent said aperture whereby said blade extensions create an axial air flow through said motor and through said aperture.

17. The air conditioner of claim 16 wherein said motor is sealingly connected to said aperture whereby air drawn through said aperture must pass through said motor.

18. The air conditioner of claim 16 wherein said motor includes an axially located shaft connected to said tangential blower through said aperture.

19. The air conditioner of claim 16 wherein said tangential blower includes an end disk adjacent to said aperture, and said blade extensions protrude beyond said end disk towards said aperture.

20. The air conditioner of claim 16 wherein said motor includes an outer shell which includes an apertured end bell, and said motor is sealingly connected to said sidewall around said aperture whereby air drawn through said aperture must pass through said end bell.

21. The air conditioner of claim 16 wherein said motor is mounted on the exterior surface of said sidewall.

22. The air conditioner of claim 16 wherein said motor includes an outer shell, and said outer shell includes an end bell having a plurality of air vents therein for allowing air to pass into and through said motor shell.

* * * * *